United States Patent [19]

Harkness et al.

[11] 4,135,882
[45] Jan. 23, 1979

[54] FOAM INJECTION NOZZLE

[75] Inventors: Jack W. Harkness, 12403 72nd St, Alto, Mich. 49302; Maurice P. Mefford, Grand Rapids, Mich.

[73] Assignee: Jack W. Harkness, Alto, Mich.

[21] Appl. No.: 776,835

[22] Filed: Mar. 14, 1977

[51] Int. Cl.² .............................................. B29D 27/02
[52] U.S. Cl. ................................ 422/133; 252/359 E; 261/DIG. 26; 366/178
[58] Field of Search ................ 23/252 R, 285, 288 E; 259/4 R; 222/145; 137/604; 239/433, 432, 602; 260/2.5 BC; 261/18 B, DIG. 26; 252/359 E; 366/178, 83, 337, 340

[56] References Cited

U.S. PATENT DOCUMENTS

| 2,766,975 | 10/1956 | Herrod | 261/18 B |
|---|---|---|---|
| 3,157,361 | 11/1964 | Heard | 239/432 X |
| 3,186,959 | 6/1965 | Shriver et al. | 23/252 R |
| 3,256,067 | 6/1966 | Shriver et al. | 23/252 R X |
| 3,285,007 | 11/1966 | Carlisle et al. | 239/432 |
| 3,618,856 | 11/1971 | Sachnik | 252/359 E |
| 3,711,020 | 1/1973 | Zelna | 239/602 |
| 3,902,850 | 9/1975 | Lehnert | 260/2.5 BC X |
| 4,021,386 | 5/1977 | Lindström | 259/4 R |
| 4,038,037 | 7/1977 | Wilmsen | 23/252 R |
| 4,060,572 | 11/1977 | Widmann | 261/18 B |

Primary Examiner—Morris O. Wolk
Assistant Examiner—Michael S. Marcus
Attorney, Agent, or Firm—Price, Heneveld, Huizenga & Cooper

[57] ABSTRACT

A nozzle for the injection of urea-formaldehyde foam insulation in a building includes a two-stage foaming chamber in the foam chemical line which includes a plurality of jets for effecting bubbling of the foaming chemical and a bubble-sizing, apertured plate positioned downstream of the jets to further enhance the foaming action of the chamber. The nozzle further includes a body into which the foaming agent is coaxially deivered with respect to an axailly extending resin injector. The end of the resin injector extends from the body of the nozzle and a flexible injection hose is removably attached to the end of the nozzle such that the resin and foaming agent mix in the flexible hose.

10 Claims, 6 Drawing Figures

FOAM INJECTION NOZZLE

BACKGROUND OF THE INVENTION

The present invention relates to an injection nozzle, and more particularly, to a nozzle for the injection of foam insulation comprising a mixture of foaming agent and a hardening resin.

The injection of foam insulation into buildings has in the past been largely an art by which the operator must carefully adjust the flow rate of pressurized air, foaming agent and liquid resin into prior art nozzles which are then inserted into apertures between the wall spaces of a building for the injection of the liquid foam insulation which subsequently hardens. U.S. Pat. No. 3,186,959 issued June 1, 1965 to D. S. Shriver et al. and U.S. Pat. No. 2,992,194 issued July 11, 1961 to H. C. Paulsen are representative of prior art systems for such injection. In other commercially used foam injection nozzles, a beaded chamber is employed by which a mixture of air and foaming agent passes in order to cause the desired foaming of the liquid foaming agent before mixture with the hardening resin.

A common problem with prior art nozzles of this construction is that the foaming chamber can become relatively easily clogged thereby disabling the nozzle. Also the expanded foaming agent and liquid resin hardener are mixed within the nozzle body which also frequently clogs requiring disassembly of the nozzle before it can again be used. These problems cause significant difficulties at the job site where the operator frequently must repeatedly disassemble the nozzle and attempt to clear the blockage before proceeding with the installation of the foam insulation. The problem becomes particularly acute to the operator in cold or other inclement weather encountered by the operators.

SUMMARY OF THE INVENTION

In order to overcome the persistent difficulties of the prior art nozzles, the nozzle of the present invention includes an improved system for foaming the liquid foaming agent prior to its mixing with the resin hardening agent by eliminating the prior art use of a bubbling chamber having a plurality of beads which can be easily clogged. Further, the nozzle of the present invention incorporates a design by which a removable, flexible injection hose defines the mixing area for the resin hardening agent and foaming agent. Thus should a blockage occur in this area, it can be easily cleared simply by removal of the flexible hose without disassembly of the entire nozzle.

Nozzles embodying the present invention, therefore, include an improved foaming chamber including a plurality of jets for separating the liquid foaming agent into a plurality of intermixing streams and an apertured plate positioned downstream of the jets for secondary foaming action. According to another aspect of the invention, the nozzle includes a resin injector extending from the discharge end and the foaming agent is introduced coaxially to the injector. A flexible injection hose is removably attached to the discharge end of the nozzle and defines the mixing chamber for the resin and foaming agent.

These and other features, objects, and advantages of the present invention will best be understood by referring to the following description thereof together with the drawings in which:

DETAILED DESCRIPTION OF THE PREFERRED EMBODIMENT

Figure 1:
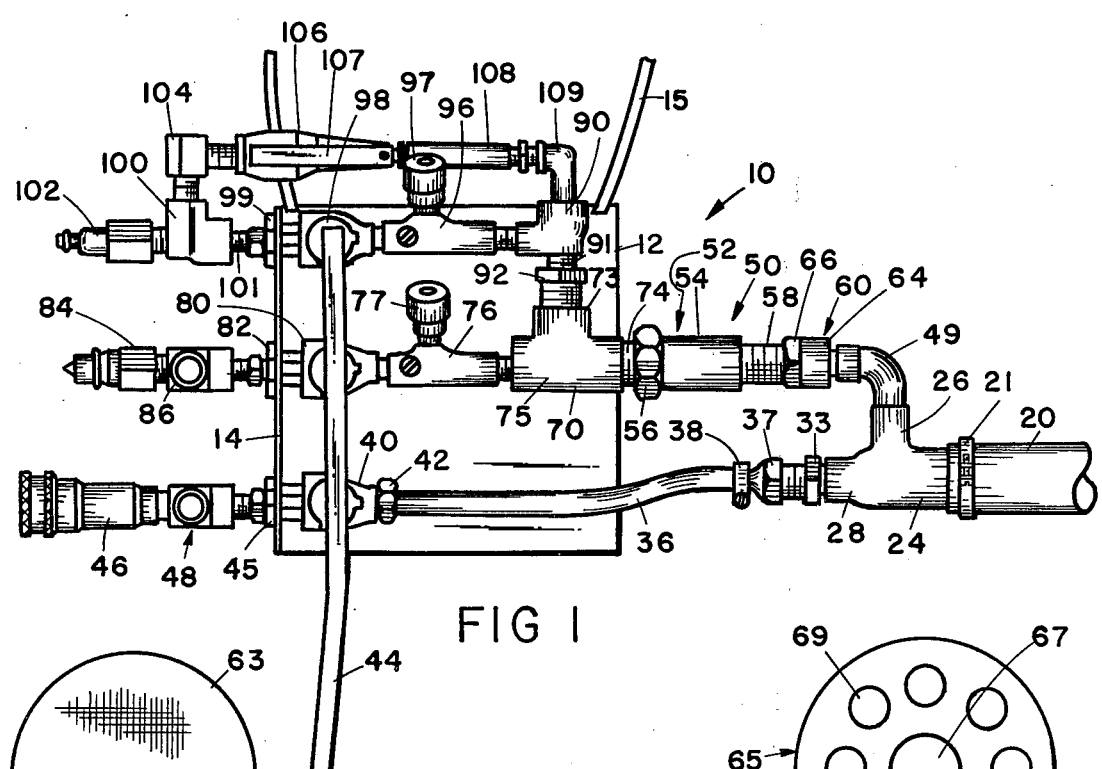
FIG. 1 is a fragmentary side elevational view of a nozzle constructed according to the teachings of the present invention.

Referring now to FIG. 1 there is shown a nozzle 10 constructed according to the preferred embodiment of the present invention for the injection of a urea-formaldehyde (U.F.) foam insulation material into buildings, vehicles, or any structure requiring insulation or sound deadening. The nozzle can be employed for the installation of many commercially available U.F. foams of the general type disclosed in U.S. Pat. No. 3,979,341 issued Sept. 7, 1976 to M. Wiedmann, the disclosure of which is incorporated herein by reference. U.F. foam is made by combining a liquid foaming agent and a resin hardener in a nozzle using pressurized air for foaming the foaming agent and for providing a portion of the injection pressure. Liquid pumps are employed to supply the liquid foaming agent and hardener to the the nozzle and also provide pressure for injection of the mixture. The mixture is liquid when injected resembling shaving cream and cures within the building to become structurally rigid.

Nozzle 10 includes a flat, rectangular backing plate 12 having an outwardly turned, vertically extending lip 14 for mounting the various fittings defining the nozzle to plate 12. A carrying strap 15 is attached at opposite ends to plate 12 and fits over the shoulder of the operator for carrying the nozzle with the surface of plate 12 opposite that shown in FIG. 1 against the hip of the operator.

A flexible injection hose 20 is removably secured to an annular recess or seat 22 (FIG. 2) defining the discharge end of nozzle body 24. The injection hose in the preferred embodiment had a length of approximately six to eight feet and a diameter of three-quarters of an inch. The hose is thus adapted to fit within approximately one inch diameter holes drilled in the walls of a structure such as a building or a vehicle permitting the hose to be extended within the wall space between inner and outer walls for the injection of the foam insulation therefrom. In the preferred embodiment, the hose was made of a Nylon braid reinforced polyvinyl chloride (PVC) and secured to the discharge end of a nozzle body 24 by means of a standard, stainless steel hose clamp 21.

Figures 2, 3, 4:
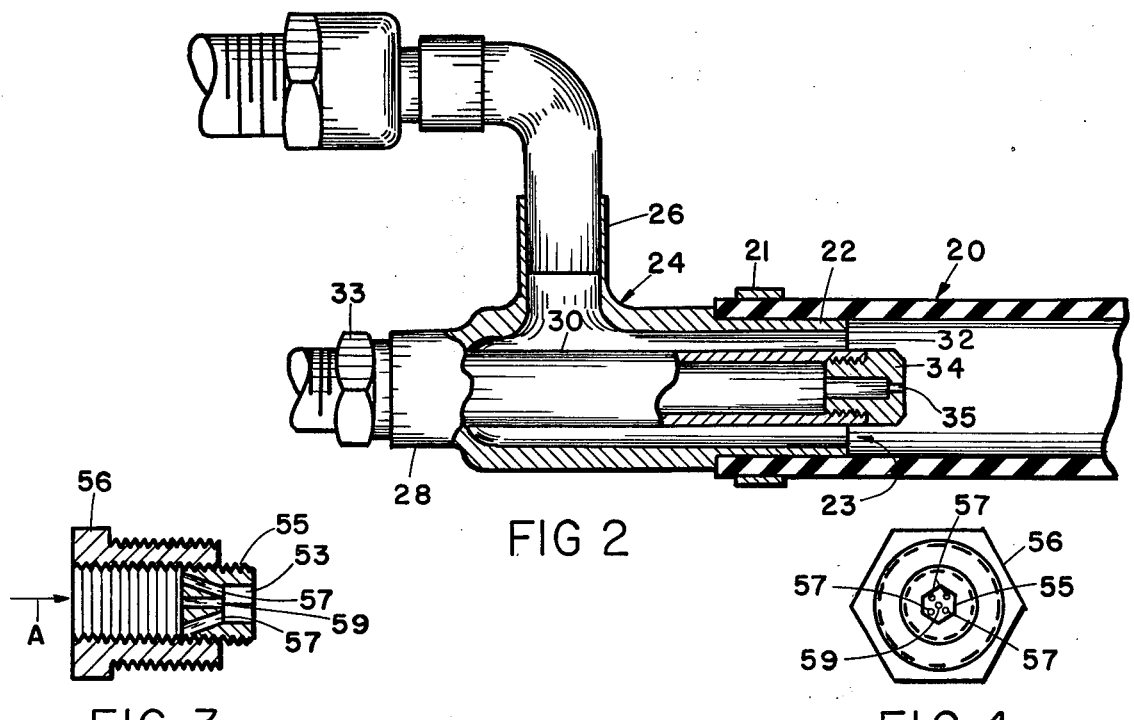
FIG. 2 is an enlarged fragmentary cross section of a portion of the nozzle shown in FIG. 1.
FIG. 3 is an enlarged cross-sectional view of a jet assembly portion of the nozzle shown in FIG. 1.
FIG. 4 is a right end view of the jet assembly shown in FIG. 3.

The nozzle body 24 is a generally T-shaped, copper fitting having, in addition to a discharge outlet 23, a foaming agent inlet 26 and an inlet 28 for receiving a resin injector tube 30 (FIG. 2). Injector tube 30 extends axially within the nozzle body as best seen in FIG. 2 and is located along the longitudinal axis with an annular space 32 extending between the outer wall of injector tube 30 and the inner wall of the nozzle body 24. At the discharge end of injector tube 30 there is provided an injector nozzle comprising a Steinen Model SM-101 having a centrally located aperture 35 with a diameter of 0.062 inches. The nozzle 34 is suitably threaded in the discharge end of tube 30 with the opposite end secured to inlet 28 by means of a standard fitting 33. Liquid resin forming one of the components of the U.F. foam is supplied to tube 30 by means of a flexible hose 36 secured at one end to fitting 33 by means of a second threaded fitting 37 and hose clamp 38 and to the opposite end to a shut-off valve 40 by means of a fitting 42. A valve handle 44 is coupled to valve 40 as well as to remaining valves as discussed below to provide rapid, simultaneous turn-off of the air pressure, foaming agent resin to the nozzle assembly 10. The end of valve 40 remote from tube 36 is secured to lip 14 of backing plate 12 by means of a fitting 45 to which in turn there is coupled a quick disconnect coupling 46 through suitable fittings shown at 48.

Soldered to the foam inlet 26 of the copper nozzle body 24 is a copper elbow 49. Coupled to the end of elbow 49 remote from body 24 is a foaming chamber 50 comprising an upstream foaming jet assembly 52 and a downstream apertured plate and screen assembly 60 coupled together by means of a threaded coupling 58. The jet assembly 50 comprises a cylindrical body 54 threaded at one end to receive fitting 58 and at the other end to receive an externally threaded plug 56. The interior of the jet assembly 52 is best seen in FIGS. 3 and 4 and comprises a threaded plug 56 externally threaded to fit within the internally threaded cylinder 54 and internally threaded to receive a jet nozzle 55 having a plurality of apertures 57 spaced radially, outwardly from a center aperture 59. Apertures 57 converge inwardly in the direction of flow of foaming agent indicated by arrow A in FIG. 3 to provide a plurality of streams of foaming agent which, in the embodiment shown in FIGS. 3 and 4, criss-cross to enhance the foaming action by the mixing of the liquid foaming agent and compressed air supplied at the inlet end of fitting 56. In other embodiments, the apertures 57 and 59 may extend longitudinally, although it has been found that the converging jet assembly is preferable. In the preferred embodiments, the apertures 57 and 59 had a diameter of about 3/32 of an inch and a mean length of about ¼ of an inch. Apertures 57 converge at an angle of about 10° to 35° in the preferred embodiment. Plug 55 has a hexagonal recess 53 in the end for securing the jet nozzle within the plug 56.

Figure 6:
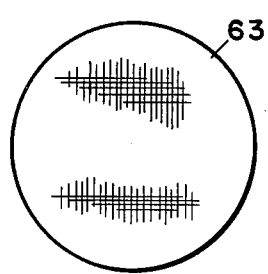
FIG. 6 is an enlarged end view of a screen incorporated in the nozzle shown in FIG. 1.
Figure 5:
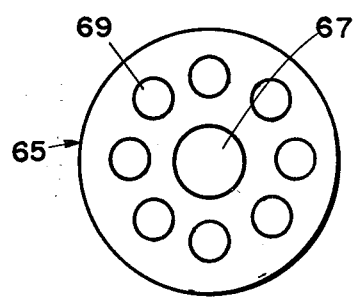
FIG. 5 is an enlarged end view of an apertured plate incorporated in the nozzle shown in FIG. 1.

Downstream of the jet assembly 52 is the apertured plate assembly 60 which includes a disc 65 shown in enlarged form in FIG. 5 and screen 63 (FIG. 6) positioned upstream and adjacent disc 65. Disc 65 includes a central aperture 67 having a diameter of ¼ of an inch and eight apertures 69 having ⅛ inch diameters spaced radially, outwardly from aperture 67 and equally spaced around the disc. Disc 65 has a diameter of ⅞ of an inch, a thickness of ⅛ of an inch, and is secured together with the 80 mesh screen 63 within an annular recess formed in body 64 by the nut 66.

Thus as foaming agent and compressed air pass through foaming chamber 50, the mixture of foaming agent and compressed air first is divided into streams in the jet nozzle, which streams intermix and subsequently are forced through the apertured plate 65 which further increases the agitation and sizes and bubbles of the foaming agent which subsequently enter the annular space 32 of the nozzle body 24.

The mixing of the foaming agent with the liquid resin hardener takes place within the flexible injection hose 20 inasmuch as the injector nozzle 34 extends beyond the discharge end of nozzle body 24 such that no mixing of the resin and foaming agent can take place within body 24. Thus should for any reason the nozzle become clogged or the resin foam set up within the injection hose 20, the hose can be easily removed by removing clamp 21 and clearing the flexible hose by, for example, striking it against the ground and flushing water therethrough. Similarly, the foaming chamber 50 can readily be disassembled by means of nuts 56 and 66, if necessary, to clear the jet nozzle 52 or the aperture plate assembly 60.

Liquid foaming agent and pressurized air are introduced into the foaming chamber by a T-fitting 70 having a discharge end 72 coupled to the foaming chamber by means of a short threaded pipe section 74. The input end 75 of fitting 70 is coupled to a needle valve 76 having an adjustment knob 77. The input of needle valve 76 in turn is coupled to a quick disconnect shut-off valve 80 controlled by handle 44. The input of valve 80 is in turn secured to the lip 14 of plate 12 by means of a threaded nut 82 and to a quick disconnect fitting 84 by means of suitable pipe couplings 86.

Pressurized air is supplied to the T-fitting 70 at inlet 73 by means of a coupling 92 and pipe 91 coupled to one end of a T-fitting 90. One inlet of T-fitting 90 is coupled to a second needle valve 96 having an adjustment knob 97 thereon. The input to valve 96 is coupled to a quick shut-off valve 98 also coupled to control handle 44. Valve 98 in turn is secured to lip 14 of the nozzle plate by means of a fitting 99. A T-fitting 100 has an outlet coupled to fitting 99 through an adapter coupling 101 and an inlet coupled to a standard quick disconnect, pneumatic fitting 102. The remaining outlet of T-connector 100 is coupled to an elbow fitting 104 in turn coupled to a standard spring-loaded air valve 106 having an actuating lever 107. The output of valve 106 is coupled to the remaining input of T-connector 90 by means of a section of tubing 108 and an elbow connector 109. The purpose of valve 106 is to by-pass the needle valve 96 in order to clear the nozzle with a blast of compressed air.

Having described the construction of the nozzle assembly and its various components in detail, a description of the nozzle with a commercially available urea-formaldehyde foam sold under the trademark "AFS-38" available from Advanced Foam Systems, Inc. of Grand Rapids, Michigan is now described.

OPERATION

The connections to the nozzle inputs 46, 84 and 102 are made to the hoses leading to the hardening resin, the liquid foaming agent and the air compressor respectively. The resin and liquid foaming agents are pumped to the nozzle by means of liquid pumps providing approximately 80 p.s.i. fluid pressure. The air compressor is regulated to provide a supply of approximately 60 p.s.i. air.

To adjust the nozzle for proper mixture, initially the air supply valves 96 and 106 are turned off. Next, the foam valve 76 is adjusted with the injecting tube 20 disconnected so that the liquid resin coming from injector 34 and the liquid foaming agent from the annular space 32 can be separately collected by collecting vessels. Valve 76 is adjusted such that the ratio of the resin weight divided by the foaming agent weight lies within a range of 1.4 to 1.6. Typically, it has been found that the flow rate of the resin is approximately 1.4 gallons per minute at 80 p.s.i. Once the ratio of the foaming agent to the resin hardener has been adjusted, the injector hose 20 is connected to the nozzle body and the air supply valve 96 is adjusted such that a one gallon container of the resultant urea-formaldehyde foam weighs between 325 to 375 grams. For this purpose, a standard disposable, one gallon-size plastic bag of negligible weight can be employed as a container.

Once this adjustment has been completed, the nozzle is ready for the installation of the foam which, as discussed above, involves the insertion of the injecting nozzle 20 into a pre-drilled aperture such that the wall space between inner and outer walls of a building, vehicle or other object can be filled. The nozzle is operated by simultaneously opening valves 40, 80 and 98 using the common handle 44 for the injection of foam and the closing of the valves via the handle 44 to stop the injection. If the operator wishes to take a break, valve handle 44 is moved to a valve closing position shown in FIG. 1 and lever 107 on the valve 106 is momentarily depressed to force compressed air through the nozzle, clearing it of chemical mixture such that it can be left unattended for a period of time without clogging.

Such nozzle construction and method of operation provides a precise means by which urea-formaldehyde foam can be mixed and installed with a minimal amount of maintenance on the nozzle. It will become apparent to those skilled in the art that various modifications to the preferred embodiment of the present invention can be made without departing from the spirit or scope of the invention as defined by the appended claims.

The embodiments of the invention in which an exclusive property or privilege is claimed are defined as follows.

1. A nozzle for use in the mixing and injection of a liquid foaming agent and a resin hardener comprising:
   a body including a cylindrical chamber with a discharge opening at one end and first and second inlets spaced from said one end;
   a hollow injection tube coupled to said first inlet and extending axially through said chamber, said tube having an outer diameter less than the inner diameter of said chamber to define an annular space between said tube and cylindrical chamber, said tube including an injector at an end which extends beyond the discharge opening of said body;
   means for supplying liquid resin to said injection tube at an end remote from said injector;
   means for supplying foaming agent to said second inlet of said body and said chamber in the annular space surrounding said injection tube; and
   a flexible injector hose removably coupled at one end to said discharge opening of said body for the mixing of the foaming agent and resin hardener within said hose and the discharge of the mix therefrom.

2. The apparatus as defined in claim 1 wherein said means for supplying foaming agent comprises a foaming chamber having an outlet coupled to said second inlet and an inlet, and means for supplying liquid foaming agent and pressurized air to said inlet of said foaming chamber.

3. The apparatus as defined in claim 2 wherein said foaming chamber comprises a two-stage assembly including a jet nozzle and an apertured disc positioned in the flow stream of fluid from said inlet to said outlet respectively and wherein said jet nozzle comprises a plug including a plurality of apertures formed therethrough for dividing the flow of fluid therethrough into a plurality of streams.

4. The apparatus as defined in claim 3 wherein predetermined ones of said apertures in said plug are formed therethrough in a converging angle to converge the flow of fluid streams through said plug.

5. The apparatus as defined in claim 4 wherein said apertured disc includes a central aperture and a plurality of radially spaced remaining apertures spaced at equal intervals around said central aperture.

6. The apparatus as defined in claim 5 wherein said foaming chamber further includes a screen positioned adjacent the upstream side of said apertured disc.

7. A nozzle for use in the mixing and injection of urea-formaldehyde foam insulation using pressurized air, a liquid foaming agent, and a liquid resin hardener, said nozzle including a body with a discharge opening at one end and first and second inlets spaced from said discharge opening; means for supplying liquid resin to said first inlet, means for supplying foaming agent to said second inlet for discharge from said discharge opening; an injector hose coupled at one end to said discharge opening of said body for the injection of urea-formaldehyde foam in a structure, wherein the improvement comprises:
   said means for supplying foaming agent includes an improved foaming chamber positioned in the flow path of liquid foaming agent upstream of said body, said foaming chamber comprising a two-stage assembly including a jet nozzle and an apertured disc positioned in the flow stream of fluid through said chamber with said jet nozzle upstream and wherein said jet nozzle includes a plurality of spaced apertures formed therethrough, said apertures converging at an angle of about 25° for dividing the flow of fluid into a plurality of intermixing streams.

8. The apparatus as defined in claim 7 wherein said apertured disc includes a central aperture and a plurality of radially spaced remaining apertures spaced at equal intervals around said central aperture.

9. The apparatus as defined in claim 8 wherein said foaming chamber further includes a screen positioned adjacent the upstream side of said apertured disc.

10. A nozzle for the proportionate mixing of a liquid foaming agent and liquid resin hardener including air inlet means for pressurized air including a first shut-off valve and a first needle valve coupled in the path of flow of air; inlet means for liquid foaming agent including a second shut-off valve and a second needle valve; means for coupling said air inlet means to said inlet means for introducing air into the stream of liquid foaming agent; resin inlet means including a third shut-off valve; a body including a resin inlet coupled to said resin inlet means, a foaming agent inlet and a discharge opening; means for simultaneously actuating said first, second and third shut-off valves; and an injector hose coupled to said discharge opening of said body for the transmission and injection of the foam insulation into a structure, wherein the improvement comprises:
   a foaming chamber having an inlet coupled to said coupling means and an outlet coupled to said foaming agent inlet of said body, said foaming chamber including a jet nozzle for dividing the fluid flow into a plurality of intermixing streams and an apertured disc and screen positioned proximate to and downstream of said jet nozzle for additional foaming of the liquid foaming agent by the pressurized air wherein said body comprises a T-shaped member with a cylindrical chamber extending longitudinally between said resin inlet and said discharge opening and an axially extending opening communicating with said cylindrical chamber for coupling to said outlet of said foaming chamber; and an injector tube extending axially in said cylindrical chamber between said resin inlet and said discharge opening for transferring liquid resin to the discharge opening of said body, the improvement further including an injector coupled in the end of said injector tube remote from said resin inlet and having an outlet extending beyond the end of said discharge opening of said body such that the mixing of foaming agent and resin hardener takes place only in said injector hose, and wherein said injector hose is made of a flexible material.

* * * * *